United States Patent
Okaue et al.

(10) Patent No.: US 6,802,453 B1
(45) Date of Patent: Oct. 12, 2004

(54) EXTERNAL STORAGE APPARATUS AND CONTROL APPARATUS THEREOF, AND DATA TRANSMISSION RECEPTION APPARATUS

(75) Inventors: Takumi Okaue, Kanagawa (JP); Yoshio Kondo, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/467,221

(22) Filed: Dec. 20, 1999

Related U.S. Application Data

(63) Continuation of application No. 09/086,788, filed on May 28, 1998, now Pat. No. 6,170,743.

(30) Foreign Application Priority Data

Jun. 4, 1997 (JP) .............................................. 9-146913

(51) Int. Cl.⁷ .............................................. G06K 19/06
(52) U.S. Cl. ........................ 235/492; 235/487; 235/441; 361/737
(58) Field of Search ................................ 235/487, 492, 235/380, 441, 493; 361/737, 738; 439/946; 902/25, 26, 27

(56) References Cited

U.S. PATENT DOCUMENTS

| | | | | |
|---|---|---|---|---|
| 5,163,111 A | * | 11/1992 | Baji et al. ...................... 395/22 |
| 5,267,218 A | * | 11/1993 | Elbert ......................... 365/226 |
| 5,388,248 A | * | 2/1995 | Robinson et al. ............ 395/425 |
| 5,402,385 A | | 3/1995 | Ozeki et al. |
| 5,428,579 A | * | 6/1995 | Robinson et al. ...... 365/230.03 |
| 5,576,987 A | * | 11/1996 | Ihara et al. .................. 365/149 |
| 5,650,967 A | * | 7/1997 | Seibert ................... 365/185.08 |
| 5,796,092 A | * | 8/1998 | Nagata et al. ............... 235/492 |
| 5,802,551 A | * | 9/1998 | Komatsu et al. ............. 711/103 |
| 5,815,426 A | * | 9/1998 | Jigour et al. .................. 365/51 |
| 5,818,029 A | * | 10/1998 | Thomson ..................... 235/486 |
| 5,883,842 A | * | 3/1999 | Miyauchi .................... 365/200 |
| 5,974,513 A | * | 10/1999 | Matsuo et al. .............. 711/164 |
| 6,170,743 B1 | * | 1/2001 | Okaue et al. ................ 235/380 |
| 6,260,102 B1 | * | 7/2001 | Robinson .................... 711/103 |
| 6,279,069 B1 | * | 8/2001 | Robinson et al. ........... 711/103 |
| 6,616,053 B2 | * | 9/2003 | Kondo et al. ................ 235/492 |

FOREIGN PATENT DOCUMENTS

| | | |
|---|---|---|
| EP | 0 341 712 | 11/1989 |
| JP | 62-48097 | 3/1987 |
| JP | 62-179037 | 8/1987 |
| JP | 3-124397 | 12/1991 |
| JP | 5-047189 | 2/1993 |
| JP | 5-173888 | 7/1993 |
| JP | 10-171938 | 6/1998 |

* cited by examiner

*Primary Examiner*—Michael G. Lee
*Assistant Examiner*—Ahshik Kim
(74) *Attorney, Agent, or Firm*—Frommer Lawrence & Haug LLP; William S. Frommer

(57) ABSTRACT

A command generator 35, upon reception of a register instruction for checking a state of a memory card 2 received via an S/P & P/S sequencer, sets a state of an erroneous erase prevention switch 23 in a register and transmits this register content via the S/P & P/S sequnecer 31 to a host computer. According to the register content from the memory card, the host computer decides whether a write protect is ON and executes a write inhibit processing when the write protect is ON.

30 Claims, 6 Drawing Sheets

EXTERNAL STORAGE APPARATUS AND CONTROL APPARATUS THEREOF, AND DATA TRANSMISSION RECEPTION APPARATUS

This is a continuation of Ser. No. 09/086,788 filed May 28, 1998 now U.S. Pat. No. 6,170,743.

BACKGROUND OF THE INVENTION

1. Field of the Invention

The present invention relates to a memory card having an erroneous erase preventing function and its control apparatus, and a data transmission/reception apparatus.

2. Description of the Prior Art

Conventionally, an external storage apparatus such as a magnetic tape, magnetic disc, optical disc, memory card and the like is used for storing a data from an electronic apparatus such as computer, digital still camera and the like. Especially, the memory card is widely used for its convenience for carrying and high transfer rate.

Similarly as a flexible disc, a memory card as an erroneous erase prevention switch for preventing an erroneous erase of a data stored. However, a conventional erroneous erase prevention switch is provided on a main plane of the card memory body and a user cannot operate the switch when the memory card is mounted on an electronic apparatus.

In this case, if the memory card is inserted into an electronic apparatus and the user find that the memory card is disabled for writing, the user cannot write a new data on a data already stored. The user should pull out the memory card from the electronic apparatus, set the erroneous erase prevention switch to a writable mode, and again mount the memory card into the electronic apparatus. It has been desired to improve the switching operationability of the erroneous erase prevention switch.

SUMMARY OF THE INVENTION

It is therefore an object of the present invention to provide a memory card capable of preventing an erroneous erase of a data stored or another data writing on the data stored, while enabling to freely set the erroneous erase prevention switch to a desired mode, and its control apparatus, and its data transmission apparatus.

In order to achieve the aforementioned object, the memory card according to the present invention is a memory card for storing a data transmitted from a control apparatus, the memory card including: storage means for storing a data from the control apparatus: a switch for setting whether to inhibit writing of a data in the storage means; and control means for controlling writing of the data transmitted from the control. apparatus, on the storage means.

In the memory card, the switch can be switched even when the memory card is mounted on the control apparatus; and the control means decides a setting content of the switch when writing a data transmitted from the control apparatus and transmits a write enabled signal to the control apparatus unless the switch is set to a write disabled mode, and transmits a write disabled signal to the control apparatus if the switch is set to a write disabled mode.

The memory card control apparatus according to the present invention is a memory card control apparatus for controlling write and read of a data into/from a memory card, including: storage means for storing a data to be transmitted to the memory card; and control means for controlling write-in and read-out of a data into/from the storage means.

The control means functions in such a manner for each data write it is decided whether the memory card is set to a data write disabled mode; when a write enabled signal is received from the memory card, a data stored in the storage means is read out and written on the memory card; and when a write disabled signal is received from the memory card, read out of the data from the storage means is interrupted.

The data transmission and reception apparatus according to the present invention is for carrying out a data transmission and reception between a control block and a memory card, wherein the memory card includes: first storage means for storing a data from the control block; a switch for setting to inhibit writing of a data to the first storage means; and first control means for controlling write-in and read-out of a data into/from the first storage means, whereas the control block includes second storage means for storing a data to be transmitted to the memory card and second control means for controlling a data write-in and read-out into/from the second storage means.

In the data transmission and reception apparatus, the memory card, when writing a data transmitted from the control block, decides the setting content of the switch. Unless the switch is set to a write disabled mode, a write enabled signal is transmitted to the control block, and if the switch is set to a write disabled mode, a write inhibit signal is transmitted to the control block, thus controlling writing of a data transmitted from the control block, in the first storage means. Moreover, the first control means, for each data, decides whether the memory card is set to the data write inhibit mode. When the control block receives a write enabled signal from the memory card, the data stored in the second storage means is read out and is written in the first storage means. When a write inhibit signal is received from the memory card, read out of the data from the second storage means is interrupted.

DETAILED DESCRIPTION OF PREFERRED EMBODIMENTS

Hereinafter, description will be directed to embodiments of the present invention with reference to the attached drawings.

Figure 1:
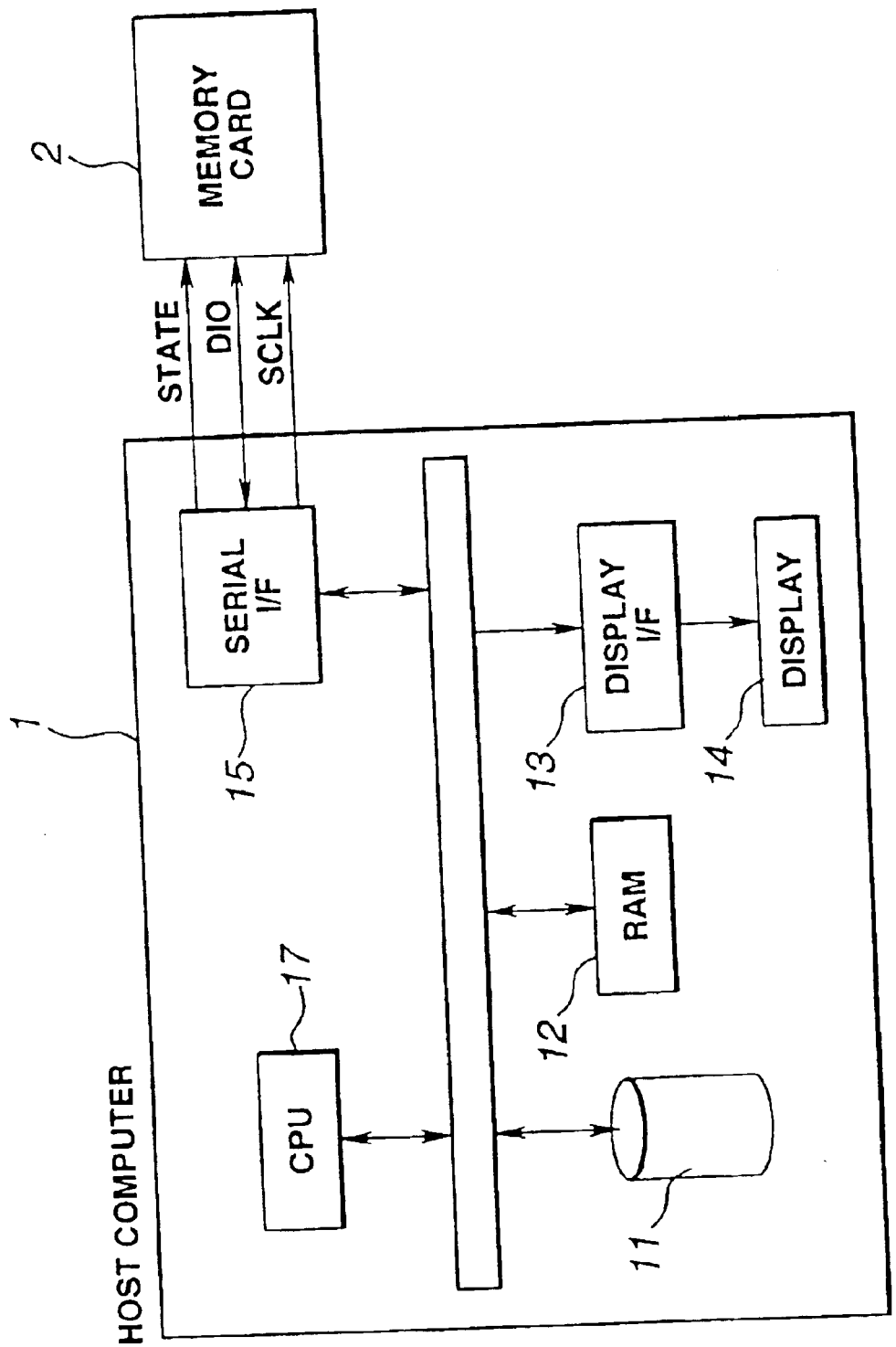
FIG. 1 is a block diagram showing a configuration of a host computer according to the present invention.

The present invention can be applied to a host computer shown in FIG. 1. and a memory card for storing a data from this host computer. It should be noted that an embodiment will be explained for a case of writing a video data transmitted from the host computer, on a memory card, but the present invention can also be applied to a data other than a video data such as an audio data.

As shown in FIG. 1, the aforementioned host computer 1 includes: a hard disc 11 for storing various data such as a video data of a still image data and an audio data; a RAM (random access memory) 12 for temporarily storing and reading out the video data and other data from the hard disc 11; a display interface (hereinafter referred to as a display I/F) 13; a display 14 for display an image according to the video data supplied via the display interface 13; a serial interface (hereinafter, referred to as a serial I/F) 15 for transmitting and receiving a data to/from a memory card 2 via three data lines; a bus 16; and a CPU (central processing unit) for the entire control.

The RAM 12, for example, temporarily stores a video data stored in the hard disc 11 via the bus 16 and, when necessary, supplies the video data via the bus 16 to the serial I/F 15.

The display 14 is supplied via the bus 16 and the display I/F 13 with the video data which has been read out from the hard disc 11 or a video data from the memory card 2, so that a still image or a moving picture is displayed according to these video data.

The serial I/F transmits a video data to the memory card 2 or receives a video data stored in the memory card 2 via the three data lines. More specifically, via a first data line, the serial I/F 15 transmits a video data and a control data for writing into the memory card 2 and receives a video data read out from the memory card 2. Via a second data line, the serial I/F 15 outputs a state signal indicating a state switched according to the image data or control data supplied via the first data line. Furthermore, via a third data line, the serial I/F 15 transmits a serial clock SCLK for transmission of the aforementioned control data and video data.

The CPU 17 controls reading out of a video data from the RAM 12 and the hard disc 11 and writing of a video data into the RAM 12 as well as controls transmission and reception of a video data to/from the memory card 2. For example, the CPU 17 issues a register instruction to decide whether a write protect of an erroneous erase prevention switch which will be detailed later is in ON state, and issues to the memory card 2 a write instruction for writing a predetermined video data with specification of an address.

Figure 2:
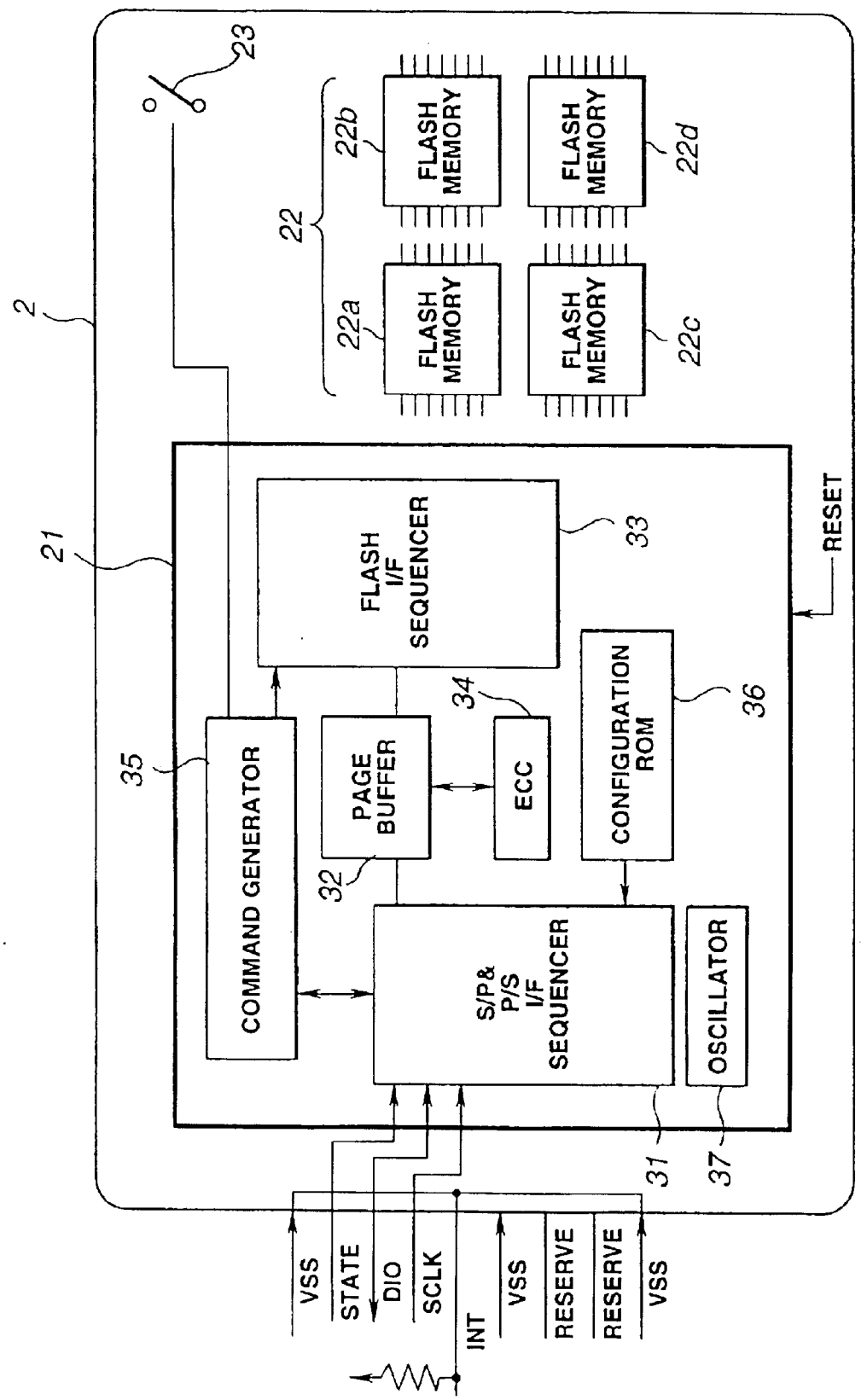
FIG. 2 is a block diagram showing a configuration of a memory card according to the present invention.

On the other hand, as shown in FIG. 2, the memory card 2 includes: a control IC 21 for receiving a video data and a control data from the aforementioned host computer 1; a flash memory for storing the video data; and an erroneous erase prevention switch 23 for preventing an erroneous erase of the video data stored in the flash memory 22.

Figure 3:
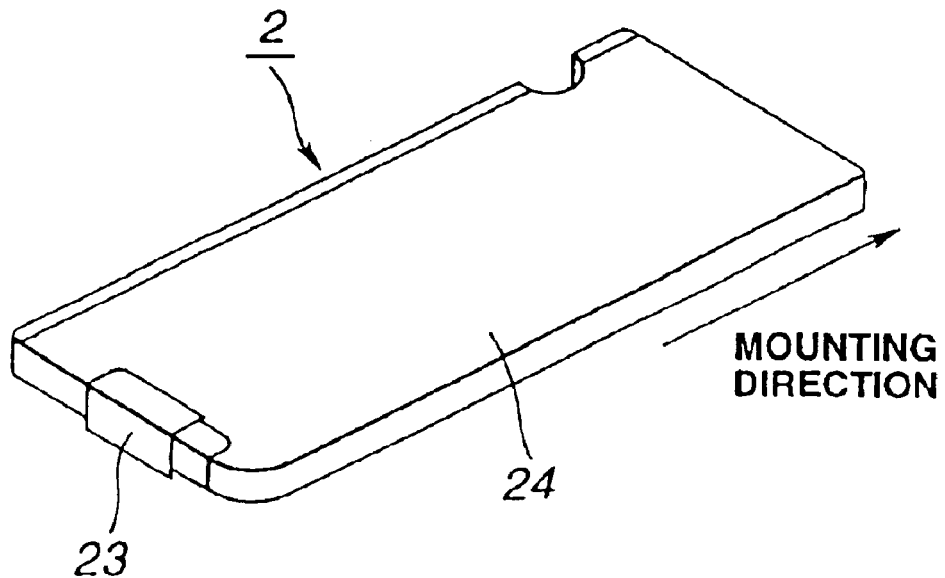
FIG. 3 is an external perspective view of the aforementioned memory card.

As shown in FIG. 3, the control IC 21, the flash memory 22, and the erroneous erase prevention switch 23 are provided in a plate-shaped member 24 formed almost in a plate shape. The erroneous erase prevention switch 23 is provided at one end of the longitudinal direction of the plate-shaped member 24, which end is opposite of the mounting direction. The erroneous erase prevention switch 23 is slidable in a direction intersecting at a right angle with the longitudinal direction of the plate-shaped member 24. When the erroneous erase prevention switch 23 is set at a left position viewed toward the mounting direction as shown in FIG. 3, it is possible to record a video data, i.e., the write protect is in OFF state.

Figure 4:
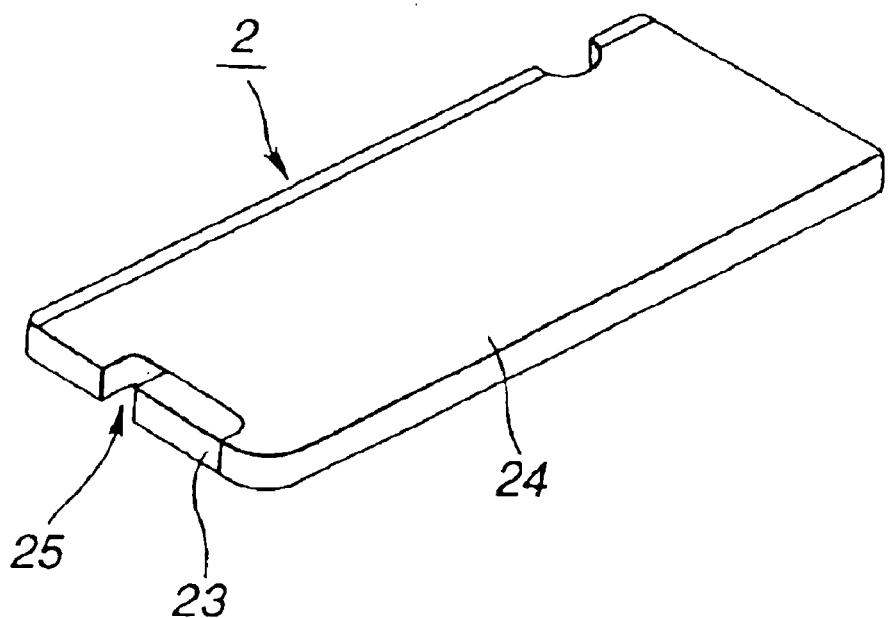
FIG. 4 is an external perspective view of the aforementioned memory card.

Moreover, as shown in FIG. 4, when the erroneous erase prevention switch 23 is at a right position viewed toward to mounting direction, a cut-off portion 25 can be seen. In this state, the memory card 2 is disabled for recording a video data. That is, the write protect is in ON state. Consequently, a user can know the state of the memory card 2 by touching it with a finger, i.e., whether the write protect is ON or OFF through presence or absence of the aforementioned cut-off portion 25 even when the memory card 2 is placed in pocket of a jacket.

The control IC 21, prior to writing a video data from the host computer 1 into the flash memory 22, decides whether the erroneous erase prevention switch 23 is set to write protect ON or OFF state, so that the video data is written in the flash memory 22 only when the write protect is OFF.

Here, more specifically, the control IC 21 includes: a serial/parallel—parallel/serial interface sequencer (hereinafter, referred to as an S/P & P/S sequencer) 31; a page buffer 32 for temporarily storing a video data from the S/P & P/S sequencer; a flash interface sequencer (hereinafter, referred to as a flash I/F sequencer) 33 for supplying the video data from the page buffer 32, to the flash memory 22; an ECC encoder/decoder 34 for carrying out an error correction processing; a command generator 35 for generating a predetermined control command; a configuration ROM (read only memory) 36 containing a version information and others; and an oscillator 37 of supplying a clock to respective circuits.

the S/P & P/S sequencer 31 is connected via the aforementioned first to third data lines to the serial I/F 15 of the host computer 1. Thus, the S/P & P/S sequencer 31 is supplied from the host computer 1 with a status signal and a serial clock SCLK as well as a serial data DIO consisting of a video data and a control data.

The S/P & P/S sequencer 31 converts the serial data DIO supplied from the host computer 1, into a parallel data in synchronization with the aforementioned serial clock SCLK. Among the parallel data, for example, the S/P & P/S sequencer 31 supplies a control data to the command generator 35 and a video data to the page buffer 32.

The page buffer is a buffer memory for storing the video data supplied from the S/P & P/S sequencer 31 on page (=512 bytes) basis. The video data stored in the page buffer 32 is added with an error correction code by the ECC encoder/decoder 34. The page buffer 32 supplied one page of video data added with the error correction code, via the flash I/F sequencer 33 to the flash memories 33a to 22d. Thus, the video data from the host computer 1 is written in the flash memories 22a to 22d.

Moreover, the image data read out from the flash memories 22a to 22d is supplied via the flash I/F sequencer 33 to the page buffer 32.

The page buffer 32 stores the video data from the flash I/F sequencer 33. Here, the ECC encoder/decoder 34 carries out an error correction processing according to the error correction code added to the data stored in the page buffer 32. The page buffer 32 reads out the data which has been subjected to the error correction processing page after another and supplies the data to the S/P & P/S sequencer 31. The S/P & P/S sequencer 31 converts the parallel video data supplied from the page buffer 32, into a serial data DIO, and transmits it to the aforementioned host computer 1.

The command generator 35 generates a control command according to a control data from the S/P & P/S sequencer 31. For example, when the command generator 35 receives a read status register instruction for checking the operation state of the memory card 2, the setting mode of the erroneous erase prevention switch 23 is determined and according to this setting mode, it is determined whether to carry out writing of a video data.

Moreover, the command generator 35 generates a busy command (hereinafter, referred to as a busy signal) indicating that a video data is being written into the flash memory 22 or a video data is being read out from the flash memory 22, and transmits the busy command via the S/P & P/S sequencer 31 to the host computer 1. When the writing or reading of a video data is complete, the command generator 35 generates a ready command (hereinafter, referred to as a ready signal) indicating the writing or reading end, and transmits the ready command via the S/P & P/S sequencer 31 to the host computer 1. The host computer 1 recognizes the operation state of the memory card 2 by receiving these busy signal and ready signal.

The configuration ROM 36 contains a version information and an information of an initial value of the memory card 2. Consequently, when a connection is made between the host computer 1 and the memory card 2, the command generator 35 firstly reads out the aforementioned version information or the like from the configuration ROM 36 via the S/P & P/S sequencer and generates a predetermined command according to the information, thus executing a predetermined initialization of the memory card 2.

Figure 5:
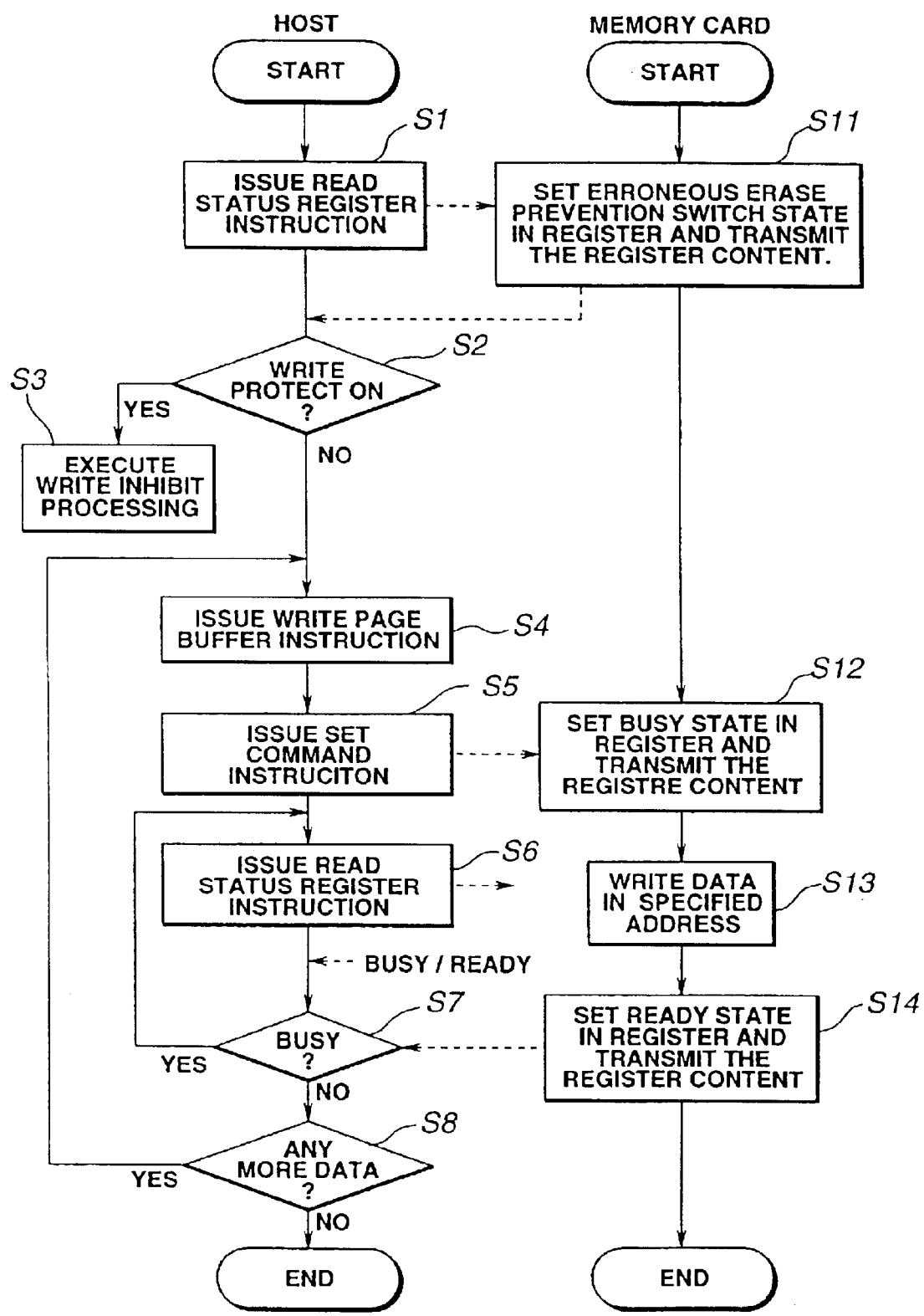
FIG. 5 is a flowchart which explains an operation procedure of the host computer and the memory card.

In the host computer 1 and the memory card 2 having the aforementioned configuration, when a video data of the host computer 1 is written into the memory card 2, as shown in FIG. 5, the host computer execute a processing of steps S1 to S8 while the memory card 2 executes the processing of steps S11 to S14.

In the host computer 1, when a video data writing to the memory card 2 is specified, the CPU 17 issues a read status register instruction to check the state of the memory card 2 (step S1) and transmits this register instruction via the serial I/F 15 to the memory card 2. This read status register instruction is issued for each of the files to be transmitted.

In the memory card 2, when the command generator 35 receives the aforementioned register instruction via the S/P & P/S sequencer 31, the state of the erroneous erase prevention switch 23 is set to a register mode, and the contents of this register is transmitted via the S/P & P/S sequencer 31 to the host computer 1 (step S11). In other words, the command generator 35 decides whether the erroneous erase prevention switch is ON, i.e., whether the write protect of the memory card 2 is ON, sets the state in the register and transmits this register content to the host computer 1.

In the host computer 1, the CPU 17, according to the register content from the memory card 2, decides whether the write protect is ON (step S2) and if the write protect is ON, carries out a write inhibit processing (step S3).

When the CPU 17 decides that the write protect is not ON, the CPU 17 issues a write page buffer instruction and reads out a video data of 512 bytes from the hard disc 11, for example, and transmits the write page buffer instruction and the video data via the serial I/F 15 to the memory card 2 (step S4).

Furthermore, the CPU 17 issues a set command instruction and issues a write instruction with specification of a write address of the aforementioned data on the memory card 2 (step S5). The CPU 17 transmits these command instructions via the serial I/F 15 to the memory card 2.

In the memory card 2, when the command generator 35 receives the set command instruction from the host computer 1 via the S/P & P/S sequencer 31, the command generator sets a busy state in the register and transmits a busy signal indicating this register content, via the S/P & P/S sequencer 31 to the host computer 1 (step S12). It should be noted that his busy signal is repeatedly transmitted to the host computer 1 until the ready state is set in the register.

Moreover, the command generator 35 issues a command for executing writing so as write one page of the video data in the aforementioned specified address of the flash memory 22 (step S13). When the writing of the one page of video data is complete, the command generator 35 sets a ready state in the register and transmits a ready signal indicating this register content, via the S/P & P/S sequencer 31 to the host computer 1 (step S14).

On the other hand, in the host computer 1, the CPU 17 issues the set command instruction in the aforementioned step S5 and after this, issues a read status register instruction to check the state of the memory card 2 (step S6). The CPU 17 decides whether the signal transmitted from the memory card 2 via the serial I/F 5 is a busy signal. If the signal is found to be a busy signal, the CPU 17 again issues the read status register instruction (step S6). That is, while the busy signal is transmitted from the memory card 2, the processing of steps S6 and S7 is repeatedly executed.

When the CPU 17 decides that the signal transmitted from the memory card 2 is not a busy signal, i.e., that the signal transmitted is a ready signal, the CPU 17 decides whether a subsequent video data to be transmitted to the memory card 2 is present. If a subsequent video data is present, control is passed to step S4, and if no subsequent video data is present, the transmission of video data is terminated (step S8). That is, a file of video data to be recorded is written on page basis into the memory card 2 by repeating the processing of steps S4 to S8 and the processing of steps S12 to S14.

As has been described above, according to the present invention, the ON/OFF state of the write protect of the memory card 2 is decided for each file recording. Consequently, if the write protect setting is changed by the erroneous erase prevention switch 23 while the memory card 2 is mounted on the host computer 1, it is possible to carry out a processing to inhibit the video data writing or record the video data according to the set content.

Moreover, the erroneous erase prevention switch 23 can be changed in the write protect setting while the memory card is mounted on the host computer 1, and accordingly there is no need of removal of the memory card 2 from the host computer 1 for switching the erroneous erase prevention switch 23, thus improving the operationability for the user.

Figure 6:
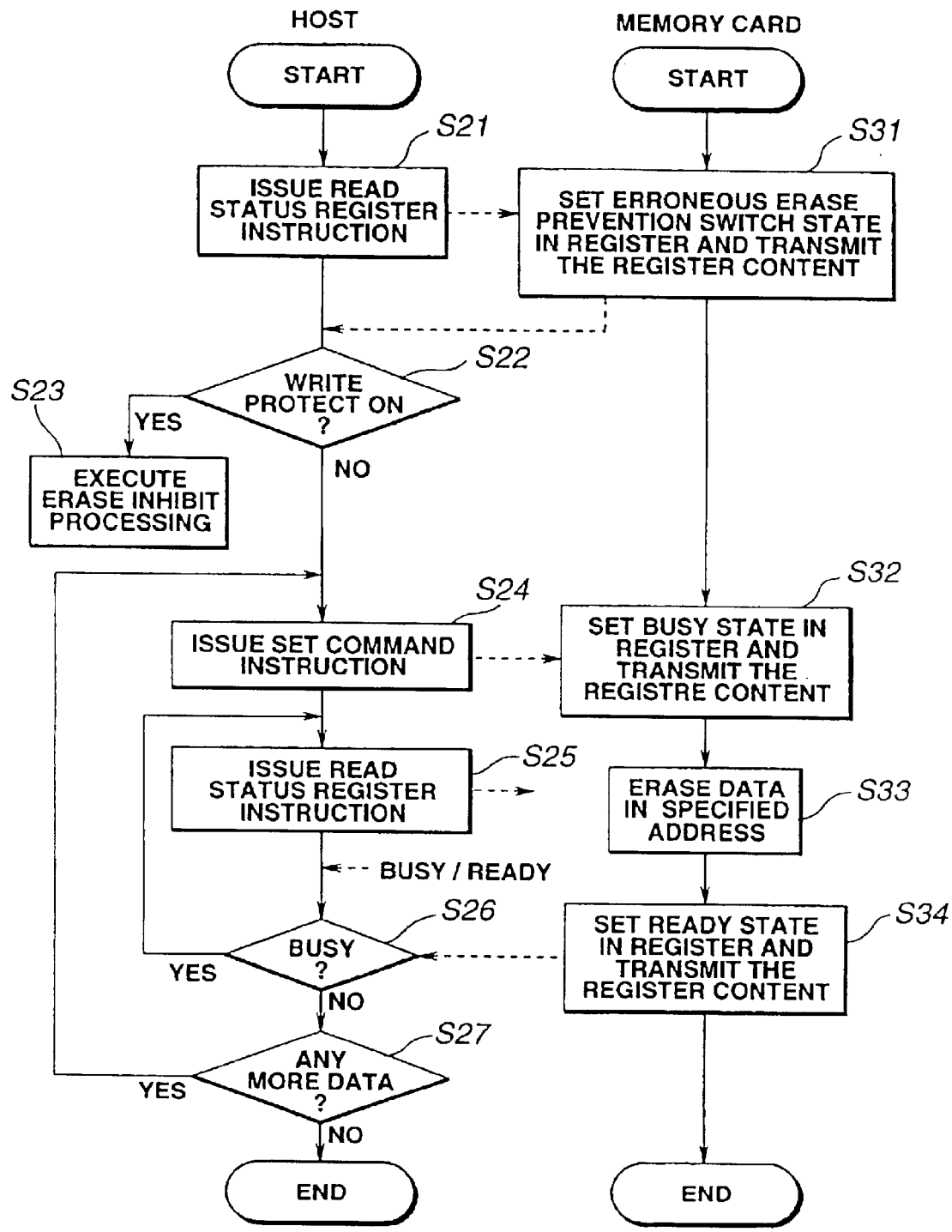
FIG. 6 is a flowchart which explains an operation procedure of the host computer and the memory card.

Next, description will directed to the operation when erasing a video data stored in the memory card 2. When erasing a video data stored in the memory card 2, as shown in FIG. 6, the host computer 1 carries out a processing of steps S21 to S27 while the memory card 2 carries out a processing of steps S31 to S34.

In the host computer 1, when an erase is set for a video data stored in the memory card 2, the CPU 17 issues a read status register instruction (step S21) so as to check the state oft he memory card 2, and transmits this register instruction via the serial I/F 15 to the memory card 2. It should be noted that this read status register instruction is issued for each of the files to be transmitted.

In the memory card 2, when the command generator 35 receives the aforementioned register instruction, the command generator 35 sets the state of the erroneous erase prevention switch 23 in a register, and transmits this register content via the S/P & P/S sequencer 31 to the host computer 1 (step S31). In other words, the command generator 35 set in register the ON or OFF state of the write protect of the memory card and transmits this register content to the host computer 1.

In the host computer 1, the CPU 17 decides whether the write protect is ON according to the register content from the memory card 2 (step S22) and if the write protect is ON, a processing to inhibit erase is carried out (step S23).

Moreover, the CPU 17 issues a set command instruction, and with specification of an address of the video data to be erased, issues an erase instruction (step S24). The CPU 17 transmits these command instructions via the serial I/F 15 to the memory card 2.

On the other hand, in the memory card 2, the command generator 35, upon reception of the aforementioned set command instruction from the host computer 1, transmits a busy signal via the S/P & P/S sequencer 31 to the host computer 1 (step S32)

Moreover, the command generator 35 issues a command to erase the video data of the specified address, so as to erase the specified video data stored in the flash memory 22 (step S33). It should be noted that in the flash memory 22, the video data is erased for each block consisting of a predetermined number of sets of one-page (512 bytes) video data and 18-byte of management information.

When the aforementioned erase of the video data is complete, the command generator 35 sets a ready state in the register and transmits a ready signal indicating the register content, via the S/P&and P/S sequencer 31 to the host computer 1 (step s34).

On the other hand, in the host computer 1, the CPU 17 issues the set command instruction in the aforementioned step S24 and after this, issues a read status register instruction to check the state of the memory card 2 (step S25). The CPU 17 decides whether a signal transmitted from the memory card 2 via the serial I/F 15 is a busy signal. If the signal is a busy signal, the read status register instruction is again issued (step S26). Consequently, while the busy signal is transmitted from the memory card 2, the processing of steps S25 and S26 is repeatedly carried out.

When the CPU 17 decides that the signal transmitted from the memory card 2 is not a busy signal, i.e., the signal transmitted is a ready signal, the CPU 17 decides whether any video data to be erased is present in the memory card 2. If any subsequent data to be erased is present, control is passed to step S24, and if no video data to be erased is present, the video data erase is terminated (step S27). That is, the file of video data to be erased is erased on block basis by repeatedly carrying out the aforementioned procedure of steps S24 to S27 and steps S32 to S34.

As has thus far been described, according to the present invention, the ON/OFF state of the write protect of the memory card 2 is checked for each file erase and if the write protect setting is changed by the erroneous erase prevention switch 23 while the memory card 2 is mounted on the host computer 1, it is possible to carry out a processing to inhibit erase of the video data according to the set content.

It should be noted that the present invention is not to be limited to the aforementioned embodiment but can be modified in various designs within the scope of the present invention.

Figure 7:
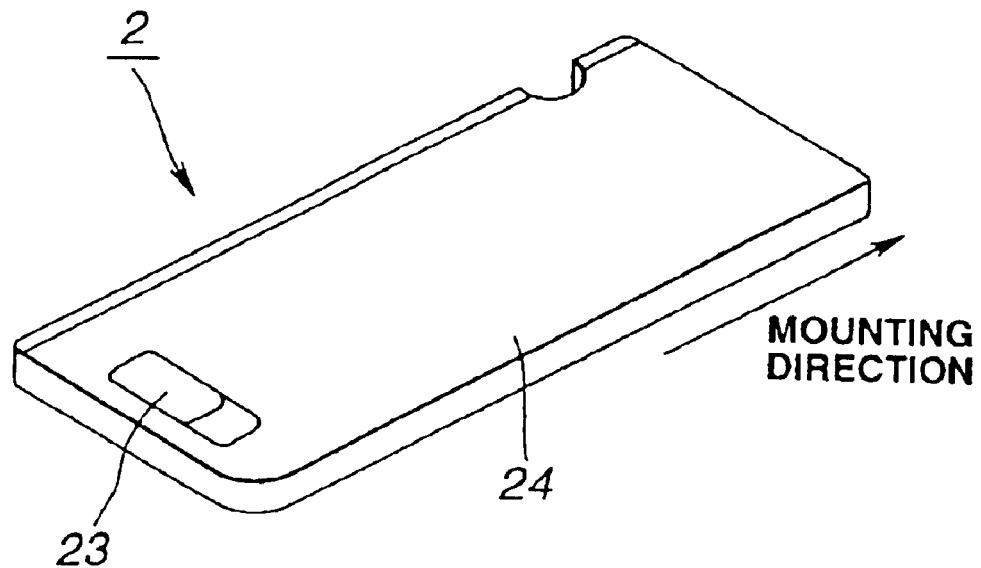
FIG. 7 is another external perspective view of the aforementioned memory card.
Figure 8:
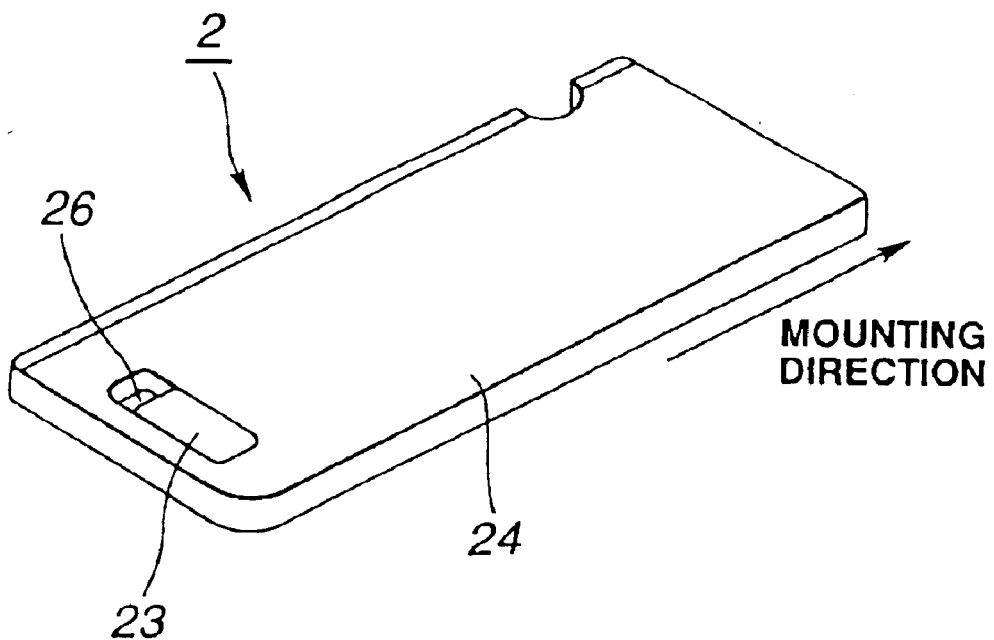
FIG. 8 is another external perspective view of the aforementioned memory card.

For example, the erroneous erase prevention switch 23 can be modified in any ways if it is provided at one end of the longitudinal direction of the plate-shaped member 24 and is slidable on the direction intersecting the aforementioned longitudinal direction at a right angle. Consequently, as shown in FIG. 7 and FIG. 8, it is possible to provide the erroneous erase prevention switch 23 on the main plane of the plate-shaped member 24. In this case, as shown in FIG. 7, when the erroneous erase prevention switch 23 is placed at the left side viewed toward the mounting direction, the write protect is set to OFF. Moreover, as show in FIG. 8, when the erroneous erase prevention switch 23 is positioned at the right side viewed toward the mounting direction, a vacancy 26 can be seen. In this state, it is possible to turn the write protect ON. Consequently, the user can know whether the vacancy 26 is present, i.e., whether the write protect is ON or OFF by touching the erroneous erase prevention switch 23 with a finger even if the memory card 2 is placed in a pocket of his/her jacket.

What is claim is:

1. A memory card for storing data transmitted from an external apparatus, said memory card comprising:
    a flash memory for storing said data transmitted from said external apparatus;
    a switch manually settable by a user to a state which inhibits writing data into said flash memory;
    an interface for transmitting data to and receiving data from said external apparatus; and
    control means for controlling said memory card in accordance with an instruction transmitted from said external apparatus, said control means sending to said external apparatus via said interface the state of said switch in response to a read status instruction transmitted thereto via said interface from said external apparatus and said control means receiving from said external apparatus data to be written to said flash memory and a write instruction signal only if the state of said switch that is sent to said external apparatus is not said state which inhibits writing.

2. A memory card as claimed in claim 1, wherein said interface includes nine connectors at least one of which transmits and receives data.

3. A memory card as claimed in claim 1, wherein said data is received from and transmitted to said external apparatus in serial form.

4. A system comprising a memory card and an external apparatus, wherein data is communicated therebetween,
    said memory card comprising:
    a flash memory for storing said data transmitted from said external apparatus;
    a switch manually settable by a user to a state which inhibits writing data into said flash memory;
    an interface for transmitting data to and receiving data from said external apparatus; and
    control means for controlling said memory card in accordance with an instruction transmitted from said external apparatus, said control means sending to said external apparatus via said interface the state of said switch in response to a read status instruction transmitted thereto via said interface from said external apparatus and said control means responding to a write instruction received from said external apparatus via said interface to write into said flash memory data received from said external apparatus;
    and said external apparatus comprising:
    a controller for writing data to or erasing data from the flash memory of said memory card, said controller transmitting a read status instruction to said memory card via said interface to determine whether a data writing operation to the flash memory of said memory card in inhibited and said controller transmitting via said interface said write instruction and said data to be written into said flash memory after said external apparatus receives said state of said switch and only if said state is not the state that inhibits writing.

5. A system as claimed in claim 4, wherein said interface includes nine connectors at least one of which transmits and receives data.

6. A system as claimed in claim 4, wherein said data is received from and transmitted to said external apparatus in serial form.

7. A memory card for storing data transmitted from a control apparatus, comprising:
storage means for storing data transmitted from said control apparatus;
a switch for determining whether to disable writing of data to said storage means; and
control means for performing a predetermined control operation in accordance with a command transmitted from said control apparatus, said control means having a register for holding contents indicative of whether said switch is set or not set to a write-disabled status, said control means responding to a switch status read command issued from said control apparatus before a data write command is issued from said control apparatus to transmit the contents of said register to said control apparatus, such that:
if said switch is set to the write-disabled status, data to be written to said storage means are not transferred from said control apparatus but write-disable processing is executed by said control means; and
if said switch is not set to the write-disabled status, data to be written to said storage means are transmitted from said control apparatus, a command for writing said data to said storage means is received from said control apparatus, and processing for writing said data to said storage means is executed by said control means.

8. The memory card according to claim 7 wherein, in accordance with said switch status read command issued from said control apparatus, said control means determines the status of said switch and, if said switch is set to the write-disabled status, contents indicative of the write-disabled status are set to the register and, if said switch is not set to the write-disabled status, contents indicative of non-write-enabled status are set to the register.

9. The memory card according to claim 7, wherein said switch status read command is issued from said control apparatus before starting the recording of a file from said control apparatus to said memory card; and,
if the status of said switch is not set to the write-disabled status as a result of the determination by said control means, the data transmitted from said control apparatus are written to sa id storage means, and if there are data to be continuously written, said data to be continuously written are transmitted from said control apparatus without further determination of the status of said switch.

10. The memory card according to claim 7, wherein said switch status read command is issued from said control apparatus for each file to be written to said storage means.

11. A control apparatus for at least writing data to a memory card of the type having a switch; comprising:
storage means for storing data to be transmitted to said memory card; and
control means for controlling at least the writing of data to said memory card;
said control means including:
issuing means for issuing a status read command for checking said memory card for the status of said switch before issuing a write command for writing data to said memory card;
receiving means for receiving contents transmitted from said memory card indicative of the status of said switch;
determining means for determining, on the basis of the received contents, whether the writing of data to said memory card is disabled; and
transmitting means for executing write-disabling processing without transmitting data to be written to storage means of said memory card if said switch is set to a write-disabled status, and for transmitting data to be written to said storage means of said memory card and for transmitting a command for writing said data to said storage means of said memory card if said switch is not set to the write-disabled status.

12. The control apparatus according to claim 11, wherein the reading of the data to be transmitted to said memory card is discontinued if said switch is set to the write-disabled status.

13. The control apparatus according to claim 11, wherein said status read command is issued before starting the recording of a file and, if said switch is not set to the write-disabled status, data to be written to said storage means of said memory card are transmitted; and if there are data to be continuously written, said data to be continuously written are transmitted to said memory card without checking the status of said switch.

14. The control apparatus according to claim 11, wherein said status read command is issued for each file to be written to said memory card.

15. A data transmitting/receiving system for transmitting/receiving data between a memory card and a control apparatus on which said memory card is loaded,
said memory card comprising storage means for storing data transmitted from said control apparatus, a switch for determining whether to disable writing data to said storage means, and control means for performing a predetermined control operation in accordance with a command transmitted from said control apparatus;
said control means of said memory card having a register for holding switch status contents indicative of whether said switch is set or not set to a write-disabled status, said control means responding to a status read command issued from said control apparatus before a data write command is issued to transmit the contents of said register to said control apparatus, such that if said switch is set to the write-disabled status, said control means executes write-disable processing, whereby data to be written to said storage means is not transmitted from said control apparatus, and if said switch is not set to the write-disabled status, data to be written to said storage means and a write command for writing said data to said storage means are received from said control apparatus and said control means executes processing for writing said data to said storage means; and
said control apparatus comprising storage means for storing data to be transmitted to said memory card and control means for controlling at least the writing of data to said memory card,
said control means of said control apparatus issuing said status read command for checking the status of said switch before issuing said write command, receiving from said memory card said switch status contents, determining on the basis of the received contents whether the writing of data to said memory card is disabled, executing write-disabling processing without transmitting data to said memory card if said switch is set to a write-disabled status, and transmitting data to be written to said storage means of said memory card and transmitting said write command if said switch is not set to the write disabled status.

16. The data transmitting/receiving system according to claim 15 wherein said control means of said memory card determines the status of said switch in response to said status read command issued from said control apparatus, and if the status of said switch is set to the write-disabled status, sets the switch status contents indicative of the write-disabled status to said register, and if the status of said switch is not set to the write-disabled status, sets the switch status contents indicative of the non-write-disabled status to said register.

17. The data transmitting/receiving system according to claim 15, wherein said control means of said apparatus discontinues reading data to be transmitted to said memory card and stored in the storage means of said control apparatus if said switch is set to the write-disabled status.

18. The data transmitting/receiving system according to claim 15, wherein said control means of said control apparatus issues said status read command before starting the recording of a file and, if said switch is not set to the write-disabled status, data to be written to said storage means of the memory card are transmitted, and if there are data to be continuously written, said data to be continuously written are transmitted to said memory card without checking the status of said switch.

19. The data transmitting/receiving system according to claim 15, wherein said status read command is issued by said control means of said control apparatus for each file to be written to said memory card.

20. A memory card for storing data transmitted from a control apparatus, comprising:
storage means for storing data transmitted from said control apparatus;
a switch for determining whether to disable writing data to said storage means; and
control means for performing a predetermined control operation in accordance with a command transmitted from said control apparatus, said control means having a register for holding contents indicative of whether said switch is set or not set to a write-disabled status, said control means responding to a switch status read command issued from said control apparatus before an erase command for erasing data is issued from said control apparatus to transmit the contents of said register to said control apparatus, such that:
if said switch is set to the write-disabled status, said control means executes data erase disable processing and said control apparatus does not transmit an erase command for erasing data, and
if said switch is not set to the write disabled state, said control apparatus transmits said erase command.

21. The memory card according to claim 20 wherein, in accordance with said switch status read command issued from said control apparatus, said control means determines the status of said switch and, if said switch is set to the disabled status, contents indicative of the write-disabled status are set to the register and, if said switch is not set to the write-disabled status, contents indicative of non-write-disabled status are set to the register.

22. The memory card according to claim 20, wherein said switch status read command is issued from said control apparatus before starting the erasure of a file from said storage means and,
if the status of said switch is not set to the write-disabled status, data are erased from said storage means and, if there are data to be continuously erased, said data to be continuously erased are erased from said storage means without checking the status of said switch.

23. The memory card according to claim 20, wherein said switch status read command is issued every time a file stored in said storage means is erased.

24. A control apparatus for at least writing data to a memory card of the type having a switch, comprising:
storage means for storing data to be transmitted to said memory card; and
control means for controlling at least the writing of data to said memory card;
said control means including:
issuing means for issuing a status read command for checking the status of said switch before issuing a write command to write data to said memory card;
receiving means for receiving contents transmitted from said memory card indicative of the status of said switch;
determining means for determining, on the basis of said received contents, whether the writing of data to said memory card is disabled; and,
transmitting means for executing data erase disable processing without transmitting an erase command for erasing data if said switch is set to a write-disabled status, and for transmitting said erase command if said switch is not set to the write-disabled status.

25. The control apparatus according to claim 24, wherein said status read command is issued before starting the recording of a file to said memory card, and if said switch is not set to the write-disabled status, said erase command is issued to said memory card, and if there are data to be continuously erased, an erase command for erasing said data to be continuously erased is issued to said memory card without checking the status of said switch.

26. The control apparatus according to claim 24, wherein said status read command is issued every time a file stored in said storage means of said memory card is erased.

27. A data transmitting/receiving system for transmitting/receiving data between a memory card and a control apparatus on which said memory card is loaded,
said memory card comprising storage means for storing data transmitted from said control apparatus, a switch for determining whether to disable writing data to said storage means, and control means for performing a predetermined control operation in accordance with a command transmitted from said control apparatus,
said control means of said memory card having a register holding switch status contents indicative of whether said switch is set or not set to a write-disabled status, said control means responding to a switch status read command issued from said control apparatus before an erase command for erasing data is issued from said control apparatus to transmit the contents of said register to said control apparatus, such that:
if said switch is set to the write-disabled status, said control means executes data erase processing and said control apparatus does not transmit an erase command for erasing data, and if said switch is not set to the write-disabled status, said control apparatus transmits said erase command; and said control apparatus comprising storage means for storing data to be transmitted to said memory card and control means for controlling at least the writing of data to said memory card, said control means of said control apparatus issuing to said memory card said status read command for checking the status of said switch before issuing a write command for writing data to said memory card, receiving said switch status contents transmitted from said memory card, determining on the basis of the received contents whether the writing of data to said memory card is disabled, and executing data erase disable processing without transmitting an erase command if said switch is set to the write-disabled status, transmitting said erase command for erasing data if said switch is not set to the write-disabled status.

28. The data transmitting/receiving system according to claim 27, wherein said control means of said memory card determines the status of said switch in response to said switch status read command issued from said control apparatus, and if the status of said switch is set to the write-disabled status, sets said switch status contents indicative of the write-disabled status to said register, and if the status of said switch is not set to the write-disabled status, sets said switch status contents indicative of non-write-disabled status to said register.

29. The data transmitting/receiving system according to claim 27, wherein said control means of said control apparatus issues said status read command before starting the recording of a file to said memory card, and if said switch is not set to the write-disabled status, issues said erase command to said memory card for erasing said data, and if there are data to be continuously erased, issues said erase command for erasing said data to be continuously erased to said memory card without checking the status of said switch.

30. The data transmitting/receiving system according to claim 27, wherein said status read command is issued by said control means of said control apparatus every time a file stored in said memory card is to be erased.

* * * * *